US011402355B2

(12) United States Patent
Campbell et al.

(10) Patent No.: US 11,402,355 B2
(45) Date of Patent: Aug. 2, 2022

(54) DETECTION OF KISS BONDS WITHIN COMPOSITE COMPONENTS

(71) Applicant: SHORT BROTHERS PLC, Belfast (GB)

(72) Inventors: William Christopher Campbell, Belfast (GB); Thomas Eoin O'Hare, Dunmurry (GB); Samuel Colin Hanna, Bangor (GB)

(73) Assignee: Short Brothers PLC, Belfast (GB)

( * ) Notice: Subject to any disclaimer, the term of this patent is extended or adjusted under 35 U.S.C. 154(b) by 467 days.

(21) Appl. No.: 16/362,341

(22) Filed: Mar. 22, 2019

(65) Prior Publication Data
US 2019/0293610 A1    Sep. 26, 2019

(51) Int. Cl.
*G01N 29/40*    (2006.01)
*G01N 29/07*    (2006.01)
(Continued)

(52) U.S. Cl.
CPC ........... *G01N 29/40* (2013.01); *G01N 29/043* (2013.01); *G01N 29/07* (2013.01); *G01N 29/11* (2013.01);
(Continued)

(58) Field of Classification Search
CPC ...... G01N 29/40; G01N 29/043; G01N 29/07; G01N 29/11; G01N 29/04; G01N 29/4445;
(Continued)

(56) References Cited

U.S. PATENT DOCUMENTS 6,234,025 B1 *  5/2001  Gieske ................. G01N 29/221
                                                          73/629
9,535,040 B2   1/2017  Kaack et al.
(Continued)

FOREIGN PATENT DOCUMENTS

DE            3822699 A1 *  1/1990  ............. G01S 7/527
DE      102016224988 A1 *  6/2018  ............. G01B 17/00
(Continued)

OTHER PUBLICATIONS

Translation DE-102016224988-A1 (Year: 2016).*
(Continued)

*Primary Examiner* — Alexander A Mercado
*Assistant Examiner* — Monica S Young
(74) *Attorney, Agent, or Firm* — Hovey Williams LLP

(57) ABSTRACT

Systems and methods for detecting a kiss bond in a composite component are provided. Using reflected ultrasound data representative of reflected ultrasound energy from the composite component, a first threshold amplitude value between 2% and 5% higher than a predetermined baseline noise amplitude value of expected material noise in the reflected ultrasound energy from the composite component, and a second threshold amplitude value higher than the first threshold amplitude value, one or more occurrences of an amplitude of the reflected ultrasound energy exceeding the threshold amplitude value and less than the second threshold amplitude value are identified. The kiss bond is detected in the composite component based on the identified one or more occurrences of the amplitude of the reflected ultrasound energy.

22 Claims, 5 Drawing Sheets

(51) Int. Cl.
*G01N 29/44* (2006.01)
*G01N 29/11* (2006.01)
*G01N 29/48* (2006.01)
*G01N 29/04* (2006.01)

(52) U.S. Cl.
CPC ..... *G01N 29/4427* (2013.01); *G01N 29/4445* (2013.01); *G01N 29/48* (2013.01); *G01N 2291/0231* (2013.01); *G01N 2291/0289* (2013.01); *G01N 2291/044* (2013.01); *G01N 2291/267* (2013.01)

(58) Field of Classification Search
CPC ........... G01N 29/48; G01N 2291/0231; G01N 2291/028; G01N 2291/044; G01N 2291/267
USPC .......................................................... 73/522
See application file for complete search history.

(56) References Cited

U.S. PATENT DOCUMENTS

| | | | |
|---|---|---|---|
| 2005/0043930 A1 | 2/2005 | Georgeson | |
| 2005/0186327 A1* | 8/2005 | Saito ...................... | G01N 25/72 427/8 |
| 2008/0229832 A1* | 9/2008 | Huang ................... | G01B 17/00 73/620 |
| 2010/0031750 A1* | 2/2010 | Spencer ................ | G01N 29/069 73/620 |
| 2010/0319452 A1* | 12/2010 | Masuda ............... | G01M 5/0033 73/594 |
| 2015/0253288 A1* | 9/2015 | Spencer ................. | G01N 29/11 73/602 |
| 2016/0231291 A1* | 8/2016 | Boulware .......... | G01N 29/0645 |
| 2017/0370885 A1* | 12/2017 | Na ..................... | G01N 29/0645 |
| 2018/0106765 A1* | 4/2018 | Kim ................... | G01N 29/4454 |
| 2018/0340858 A1* | 11/2018 | Jahanbin ............. | G01N 29/4427 |
| 2019/0033263 A1* | 1/2019 | Giurgiutiu ............. | G01N 29/46 |

FOREIGN PATENT DOCUMENTS

| | | | | |
|---|---|---|---|---|
| EP | 3236254 A1 | 10/2017 | | |
| EP | 3296728 A1 | 3/2018 | | |
| EP | 3418736 B1 * | 8/2019 | ........... | G01N 29/043 |
| JP | 2012122807 A | 6/2012 | | |
| WO | 2012125837 A1 | 9/2012 | | |
| WO | WO-2013155515 A1 * | 10/2013 | ......... | G01N 29/4436 |

OTHER PUBLICATIONS

United Kingdom Search Report dated May 18, 2018, for United Kingdom Patent Application No. GB1804675.5.
Allin, "Disbond Detection in Adhesive Joints Using Low-Frequency Ultrasound", Imperial College of Science Technology and Medicine, University of London, May 2002.
Alston, "Detecting Kissing Bonds with Nonlinear Ultrasound Techniques", Advanced Composites Center for Innovation & Science, University of Bristol, 2016.
Brotherhood et al., "The Detectability of Kissing Bonds in Adhesive Joints using Ultrasonic Techniques", Science@Direct, Ultrasonic 4 (2003).
Chakrapani et al., "Ultrasonics Testing of Adhesive Bonds of Thick Composites with Applications to Wind Turbine Blades", AIP Conference Proceedings, Iowa State University, Jul. 2011.
Haldren et al., "Nondestructive Evaluation of Adhesive Bonds via Ultrasonic Phase Measurements", (https://mech.utah.edu/ASC2016/assets/2909.pd).
Vijaya Kumar et al., "Evaluation of Kissing Bonds in Composite Adhesive Lap Joints using Digital Image Correlation: Preliminary Studies", International Journal of Adhesion & Adhesives, 42 (2013) 60-68.
Monchalin et al., "Adhesive Bond Testing Between Composite Laminates by Laser Shockwave Loading", The 19th International Conference on Composite Materials, 2010.
Olympus, "Nondestructive Bond Testing for Aircraft Composite", Multimedia Application Notes.
Poveromo et al., "Analysis of "KISS" Bonds Between Composite Laminates", SpringerLink, Jun. 2014, vol. 66, Issue 6, pp. 970-978.
Ren et al., "Ultrasonic Guided Wave Inspection of Adhesive Bonds Between Composite Laminates", International Journal of Adhesion & Adhesives, 45 (2013) 59-68.
Wood et al., "Ultrasonic Evaluation of Artificial Kissing Bonds in CFRP Composites", The e-Journal of Nondestructive Testing, vol. 19 No. 12 (Dec. 2014) ISSN 1435-4934.
Yan et al., "Experimental and Theoretical Characterization of Kissing Bonds in Adhesive Joint using Non-Linear Ultrasonic Measurement", AIP Conference Proceedings, Mar. 2010.
European Office Action dated Aug. 14, 2019, for European Patent Application No. 19164219.8.
M.A. Caminero et al.: "Analysis of adhesively bonded repairs in composites: Damage detection and prognosis," Composite Structures, vol. 95, Jan. 1, 2013, pp. 500-517.

* cited by examiner

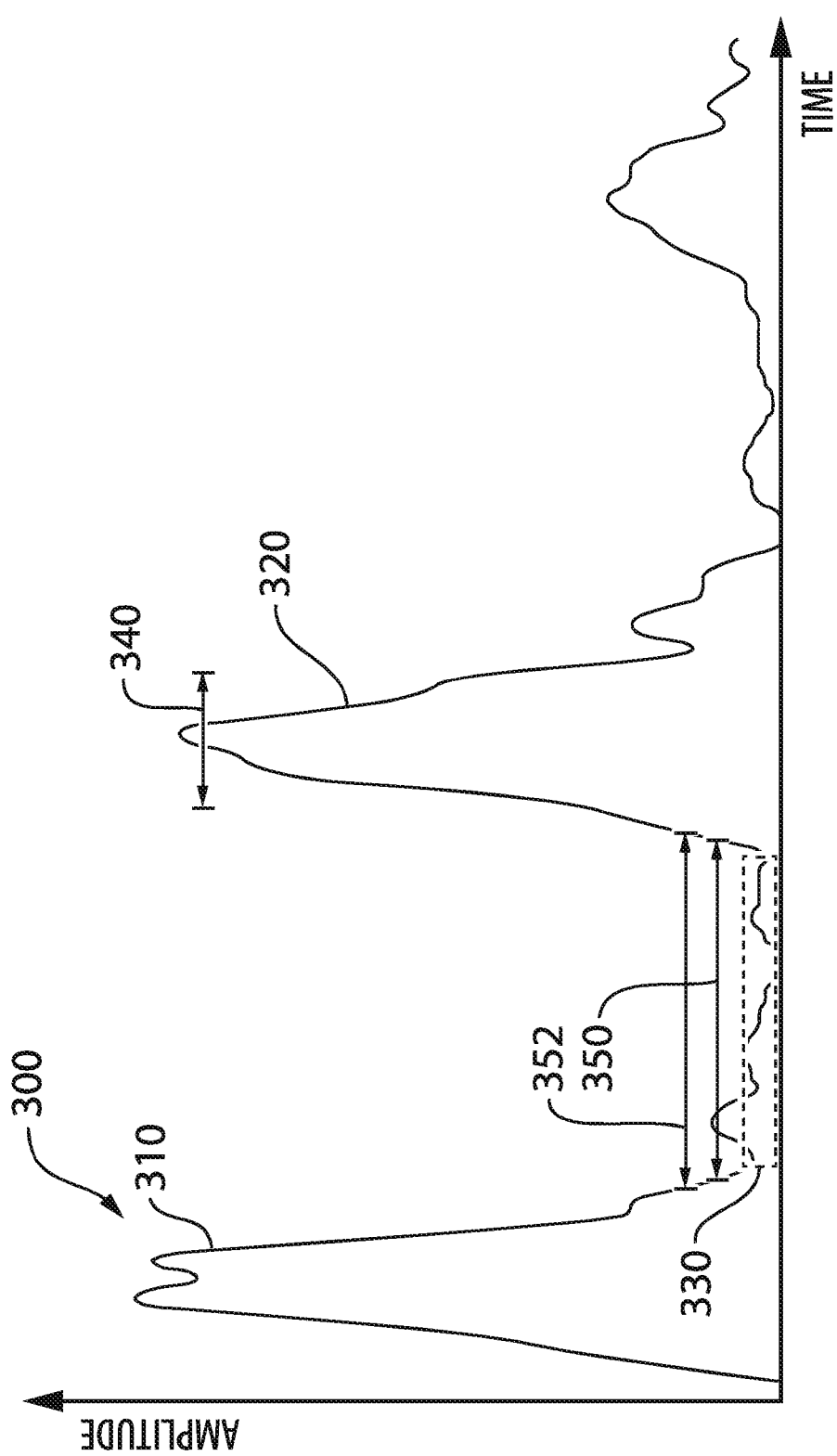

DETECTION OF KISS BONDS WITHIN COMPOSITE COMPONENTS

CROSS-REFERENCE TO RELATED APPLICATION(S)

This application is based on and claims priority to British Patent Application No. GB1804675.5, filed on Mar. 23, 2018, the entire content of which is incorporated herein by reference.

TECHNICAL FIELD

The present disclosure relates generally to composite materials, and more specifically to non-destructive inspection of composite materials.

BACKGROUND

Composite materials, which include various types of plastics and fiberglass, are relatively strong, durable and lightweight, and thus are well-regarded materials. Composite materials see increasing use in a variety of fields, from recreational goods, like bicycles and baseball bats, to various types of vehicles, including automobiles, boats, and aircraft. Increasingly, modern aircraft are using composites for various parts of the aircraft, such as the fuselage and wings. One subset of composite materials is composite laminates, which are materials formed by assembling multiple layers of fibrous composite materials. The laminates can be bonded together, for example by using an adhesive, or joined via other processes which bond the laminates substantially directly to each other.

However, in certain circumstances, the bonds between composite components having a laminated construction may contain "kiss bonds", which are interfaces which do not transfer load, or disbonds with near-zero volume. Kiss bonds can occur at the junctions between laminates, within co-cured components, or within individual laminates themselves. Although kiss bonds do bring laminates into contact with one another, kiss bonds exhibit very little of the strength commonly expected of composite bonds insofar as kiss bonds do not transfer load. Kiss bonds may be caused by poor surface preparation, moisture ingress during bonding, other contaminations, incorrect curing processes, residual stress in the materials, and the like. Due to the difficulty in detecting kiss bonds, regulatory bodies in the field of aeronautics place strict regulations on how aircraft composite components may be used, bonded together, and repaired.

As such, there is a need for techniques for detecting kiss bonds.

SUMMARY

In accordance with a broad aspect, there is provided a system for detecting a kiss bond in a composite component, the system comprising: an ultrasonic transmitter configured to emit ultrasound energy into the composite component; an ultrasonic receiver configured to receive reflected ultrasound energy from the composite component following an interaction between the composite component and the emitted ultrasound energy; at least one data processor; and non-transitory machine-readable memory operatively coupled to the at least one data processor. The machine-readable memory storing computer-readable instructions executable by the at least one data processor for: using reflected ultrasound data representative of the reflected ultrasound energy from the composite component received at the ultrasonic receiver, a first threshold amplitude value between 2% and 5% higher than a predetermined baseline noise amplitude value of expected material noise in the reflected ultrasound energy from the composite component, and a second threshold amplitude value higher than the first threshold amplitude value, identifying one or more occurrences of an amplitude of the reflected ultrasound energy exceeding the threshold amplitude value and less than the second threshold amplitude value; and detecting the kiss bond in the composite component based on the identified one or more occurrences of the amplitude of the reflected ultrasound energy.

In some embodiments, the memory stores further computer-readable instructions executable by the at least one data processor for comparing a backwall echo of the reflected ultrasound energy to a backwall echo threshold, wherein detecting the kiss bond is further based on the comparing of the backwall echo to the backwall echo threshold.

In some embodiments, detecting the kiss bond comprises determining that the one or more occurrences are associated with a non-zero depth in the composite component based on a time-of-flight parameter of the reflected ultrasound data.

In some embodiments, the computer-readable instructions are further executable for determining a depth of the kiss bond in the composite component based on the reflected ultrasound data.

In some embodiments, the computer-readable instructions are further executable for determining a one-dimensional length of the kiss bond, and wherein detecting the kiss bond is further based on comparing the one-dimensional length of the kiss bond to a threshold one-dimensional length.

In some embodiments, the computer-readable instructions are further executable for determining an area of the kiss bond based on the reflected ultrasound data.

In some embodiments, determining an area of the kiss bond comprises identifying a plurality of adjacent occurrences of the amplitude of the reflected ultrasound energy exceeding the threshold amplitude value, wherein the adjacent occurrences have substantially common depth in the composite component based on a time-of-flight parameter of the reflected ultrasound data.

In some embodiments, detecting the kiss bond is further based on comparing the area of the kiss bond to a threshold area.

In some embodiments, the computer-readable instructions are further executable for determining a location of the kiss bond within the composite component based on the reflected ultrasound data.

In some embodiments, detecting the kiss bond based on the comparing comprises determining that the backwall echo exceeds the backwall echo threshold.

In some embodiments, the backwall echo threshold is 80% of an amplitude of a backwall echo produced by a pristine composite component.

In some embodiments, the ultrasonic transmitter is configured to emit the ultrasound energy at a frequency between 5 MHz and 10 MHz.

In some embodiments, the reflected ultrasound data is representative of a half-wave rectified ultrasound signal.

In some embodiments, the computer-readable instructions are further executable for, prior to identifying the one or more occurrences, determining that the composite component is free from disbonds.

In accordance with another broad aspect, there is provided a system for detecting a kiss bond in a composite component, comprising: at least one data processor; and non-transitory machine-readable memory operatively coupled to the at least one data processor. The machine-readable memory storing computer-readable instructions executable by the at least one data processor for: using reflected ultrasound data representative of ultrasound energy reflected from the composite component, a first threshold amplitude value between 2% and 5% higher than a predetermined baseline noise amplitude value of expected material noise in the reflected ultrasound energy, and a second threshold amplitude higher than the first threshold amplitude value, identifying one or more occurrences of an amplitude of the ultrasound energy exceeding the threshold amplitude value and less than the second threshold amplitude value; and detecting the kiss bond in the composite component based on the identified one or more occurrences of the amplitude of the ultrasound energy.

In some embodiments, the memory stores further computer-readable instructions executable by the at least one data processor for comparing a backwall echo of the reflected ultrasound energy to a backwall echo threshold, wherein detecting the kiss bond is further based on the comparing of the backwall echo to the backwall echo threshold.

In some embodiments, detecting the kiss bond comprises determining that the one or more occurrences are associated with a non-zero depth in the composite component based on a time-of-flight parameter of the reflected ultrasound data.

In some embodiments, the computer-readable instructions are further executable for determining a depth of the kiss bond in the composite component based on the reflected ultrasound data.

In some embodiments, the computer-readable instructions are further executable for determining a one-dimensional length of the kiss bond, and wherein detecting the kiss bond is further based on comparing the one-dimensional length of the kiss bond to a threshold one-dimensional length.

In some embodiments, the computer-readable instructions are further executable for determining an area of the kiss bond based on the reflected ultrasound data.

In some embodiments, determining an area of the kiss bond comprises identifying a plurality of adjacent occurrences of the amplitude of the reflected ultrasound energy exceeding the threshold amplitude value, wherein the adjacent occurrences have substantially common depth in the composite component based on a time-of-flight parameter of the reflected ultrasound data.

In some embodiments, detecting the kiss bond is further based on comparing the area of the kiss bond to a threshold area.

In some embodiments, the computer-readable instructions are further executable for determining a location of the kiss bond within the composite component based on the reflected ultrasound data.

In some embodiments, detecting the kiss bond based on the comparing comprises determining that the backwall echo exceeds the backwall echo threshold.

In some embodiments, the backwall echo threshold is 80% of an amplitude of a backwall echo produced by a pristine composite component.

In some embodiments, the computer-readable instructions are further executable for, prior to identifying the one or more occurrences, determining that the composite component is free from disbonds.

In accordance with a further broad aspect, there is provided a method for detecting a kiss bond in a composite component, comprising: using reflected ultrasound data representative of reflected ultrasound energy from the composite component, a first threshold amplitude value between 2% and 5% higher than a predetermined baseline noise amplitude value of expected material noise in the reflected ultrasound energy from the composite component, and a second threshold amplitude value higher than the first threshold amplitude value, identifying one or more occurrences of an amplitude of the reflected ultrasound energy exceeding the threshold amplitude value and less than the second threshold amplitude value; and detecting the kiss bond in the composite component based on the identified one or more occurrences of the amplitude of the reflected ultrasound energy.

In some embodiments, the method further comprises comparing a backwall echo of the reflected ultrasound energy to a backwall echo threshold, wherein detecting the kiss bond is further based on the comparing of the backwall echo to the backwall echo threshold.

In some embodiments, detecting the kiss bond comprises determining that the one or more occurrences are associated with a non-zero depth in the composite component based on a time-of-flight parameter of the reflected ultrasound data.

In some embodiments, the method further comprises determining a depth of the kiss bond in the composite component based on the reflected ultrasound data.

In some embodiments, the method further comprises determining a one-dimensional length of the kiss bond, and wherein detecting the kiss bond is further based on comparing the one-dimensional length of the kiss bond to a threshold one-dimensional length.

In some embodiments, the method further comprises determining an area of the kiss bond based on the reflected ultrasound data.

In some embodiments, determining an area of the kiss bond comprises identifying a plurality of adjacent occurrences of the amplitude of the reflected ultrasound energy exceeding the threshold amplitude value, wherein the adjacent occurrences have substantially common depth in the composite component based on a time-of-flight parameter of the reflected ultrasound data.

In some embodiments, detecting the kiss bond is further based on comparing the area of the kiss bond to a threshold area.

In some embodiments, the method further comprises determining a location of the kiss bond within the composite component based on the reflected ultrasound data.

In some embodiments, detecting the kiss bond based on the comparing comprises determining that the backwall echo exceeds the backwall echo threshold.

In some embodiments, the backwall echo threshold is 80% of an amplitude of a backwall echo produced by a pristine composite component.

In some embodiments, the method further comprises, prior to identifying the one or more occurrences, determining that the composite component is free from disbonds.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which:

FIG. 3 is illustrations of an example scan of reflected ultrasound energy for an example flawless composite component;

It will be noted that throughout the appended drawings, like features are identified by like reference numerals.

DETAILED DESCRIPTION

Figure 1:
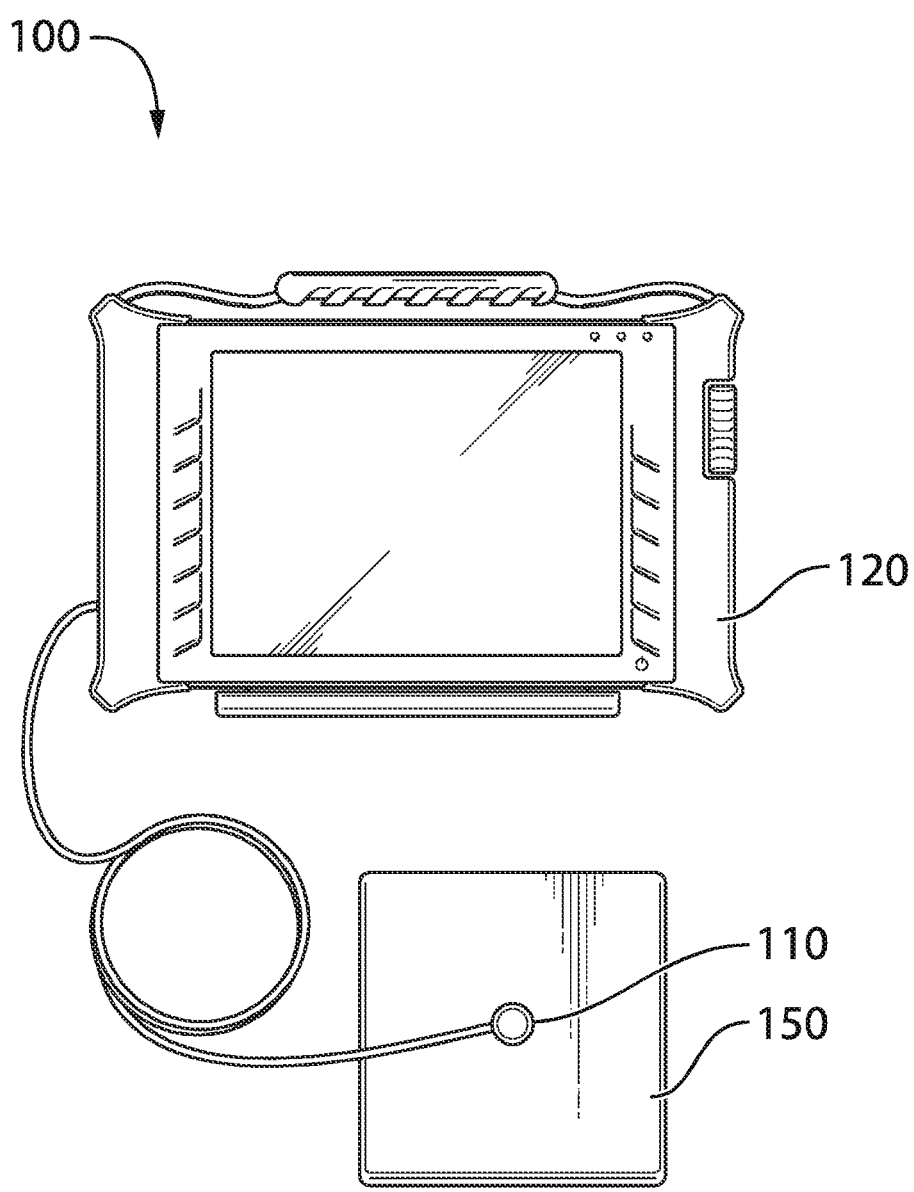
FIG. 1 is a diagram of an example kiss bond detection setup.

With reference to FIG. 1, there is shown an ultrasonic test system 100 for detecting the presence of kiss bonds in composite component 150. It should be noted that the composite component 150 can be any suitable composite material, for example composite laminates, which can be bonded with or without an adhesive substance, and can compose any suitable number of layers or plies of composite material. As described herein, composite laminates refer to any material composed of a plurality of constituent materials, including sets of reinforcing fibers held together in a matrix material, for example plastics or polymers.

The ultrasonic test system 100 is composed of an ultrasonic transceiver 110 and a control system 120. The ultrasonic transceiver 110 is configured for receiving reflected ultrasound energy which emanate from the composite component 150 as a result of an interaction between the composite component 150 and emitted ultrasound energy. Put differently, when the emitted ultrasound energy collides with or otherwise interacts with the composite component 150, some of the emitted ultrasound energy is reflected from the composite component 150. In some embodiments, the ultrasonic transceiver 110 is also configured for emitting the emitted ultrasound energy into the composite component 150. For example, the ultrasonic transceiver 110 includes both an ultrasonic transmitter and an ultrasonic receiver.

In some embodiments, a liquid interface, sometimes called a "couplant", is used to improve ultrasonic transmission between the ultrasonic transceiver 110 and the composite component 150. The liquid interface can be any suitable substance. In other embodiments, the ultrasonic test system 100 is implemented as an immersion system, wherein the composite component 150 and part or all of the ultrasonic transceiver 110 are submerged in a basin of water or another ultrasound-conductive medium. Still other ultrasound techniques are considered, including phased-array probes, and the like.

In some embodiments, the ultrasonic transceiver 110 has one or more variable settings. Depending on one or more parameters of the composite component 150, the variable settings of the ultrasonic transceiver 110 are adjusted. For example, a frequency of the emitted ultrasound energy is adjusted based on the materials which make up the composite component 150. The frequency of the emitted ultrasound energy can be any suitable frequency, for example a normalized frequency between 5 MHz and 10 MHz, as appropriate. In another example, the strength of the emitted ultrasound energy is adjusted based on the thickness of the composite component 150. Still other aspects of the emitted ultrasound energy, including amplitude, phase, and the like, are adjustable as appropriate.

The control system 120 is communicatively coupled to the ultrasonic transceiver 110 for obtaining therefrom ultrasound data representative of the emitted and/or reflected ultrasound energy and optionally various information pertaining to the emitted ultrasound energy. For example, the control system 120 receives reflected ultrasound data which is representative of the reflected ultrasound energy. In some embodiments, the control system 120 receives one or more digital representations of the reflected ultrasound energy and optionally of the emitted ultrasound energy. In other embodiments, the control system 120 receives information which characterizes the reflected ultrasound energy and optionally the emitted ultrasound energy. The control system 120 is also configured for determining whether kiss bonds are present in the composite component 150 based on the reflected ultrasound energy, and optionally the emitted ultrasound energy.

In some embodiments, part or all of the ultrasonic test system 100 is embodied in a handheld ultrasonic test device which can be positioned over a test specimen, for example the composite component 150, to detect the presence of kiss bonds in the composite component 150. In other embodiments, part or all of the ultrasonic test system 100 is embodied in a stationary test structure which is configured for receiving the composite component 150 for performing ultrasonic testing to detect the presence of kiss bonds. Still other embodiments of the ultrasonic test system 100 are considered.

Figure 2:
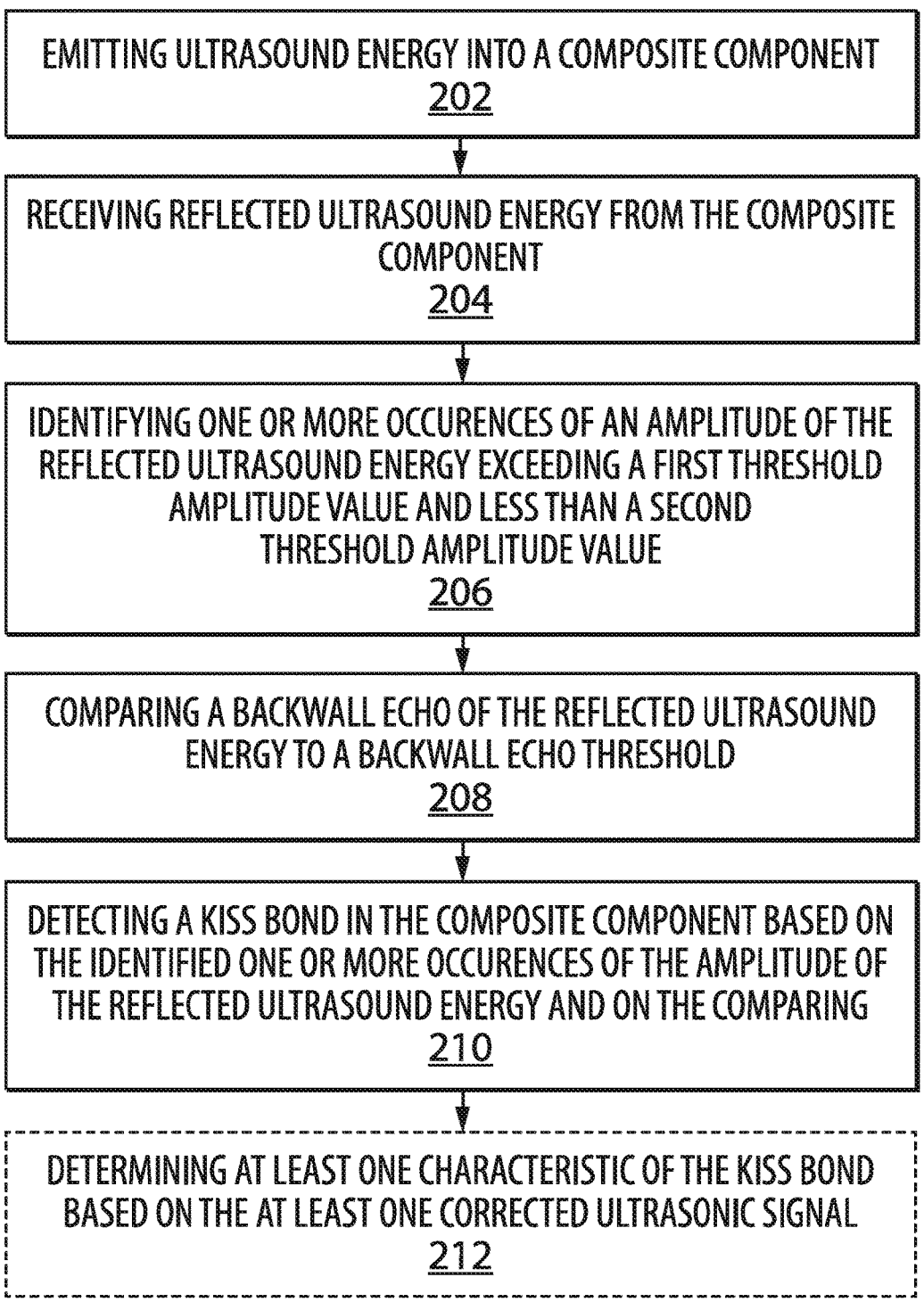
FIG. 2 is a flowchart of an example method for detecting kiss bonds.

With reference to FIG. 2, there is shown a method 200 for detecting a kiss bond in a composite component. At step 202, ultrasound energy is emitted into a composite component, for instance the composite component 150. In embodiments where the ultrasonic transceiver 110 is configured for both emitting and receiving ultrasound energy, step 202 is performed. The emitted ultrasound energy can be of any suitable frequency, amplitude, and the like, and can be produced using any suitable ultrasonic transducer. For example, the frequency of the ultrasound energy ranges between 5 to 10 MHz, although any other suitable frequency can be used. Although the ultrasound energy can be a full-wave signal, it should be noted that the techniques disclosed herein can also be applied to half-wave rectified signals.

At step 204, reflected ultrasound energy, produced by an interaction between the composite component 150 and the emitted ultrasound energy, is received. The reflected ultrasound energy can be received using any suitable transducer or other component, for example the ultrasonic transceiver 110. In some embodiments, receiving the reflected ultrasound energy comprises characterizing the reflected ultrasound energy in one or more ways. For example, the ultrasonic transceiver 110 is configured for measuring the amplitude, the frequency, the phase, and/or any other suitable characteristic of the reflected ultrasound energy. In some embodiments, the ultrasonic transceiver 110 is configured for producing a digital representation of the reflected ultrasound energy, for example the reflected ultrasound data.

It should be noted that in some embodiments, step 202 and/or 204 are previously performed by the ultrasonic transmitter 110, and can be omitted from the method 200. Additionally, in some embodiments, steps 202 and 204 are repeated substantially continuously, such that newly-produced reflected ultrasound energy, produced by the composite component 150 via newly-emitted ultrasound energy, is substantially continuously captured by the ultrasonic transceiver 110, and reflected ultrasound data can be generated in a substantially continuous fashion.

At step 206, one or more occurrences of an amplitude of the reflected ultrasound energy exceeding a first threshold amplitude value and being less than a second threshold amplitude value are identified. The identification of the occurrences is made using the reflected ultrasound data, which is representative of the reflected ultrasound energy, and the first and second threshold amplitude values. The first threshold amplitude value is based on a predetermined baseline noise amplitude value of expected material noise in the reflected ultrasound energy from the composite component, and the second threshold amplitude value is set at some value higher than the first amplitude threshold value. The noise disturbances in the flawless composite component can be caused by inherent material properties, the presence of fibers or other elements (e.g., material interfaces between reinforcing fibers and matrix material) in the composite components, and the like.

In some embodiments, the first threshold amplitude value is determined experimentally. For example, a flawless (i.e., clean) composite component of comparable construction, that is to say a representative composite component known not to have kiss bonds, any type of disbonds, or any other detectable internal defects, is used to establish the baseline noise amplitude value. The baseline noise amplitude value is indicative of an expected level of noise caused by material noise in the flawless composite component. By measuring the amount of noise produced in the flawless composite component, the baseline noise amplitude value can be set, or approximated, based thereon.

With additional reference to FIG. 3, example reflected ultrasound data 300, in this example an A-scan for a composite component, is shown. Although the following discussion will focus on ultrasound data representing an A-scan, it should be noted that similar methodologies can be used for a B-scan, a C-scan, an S-scan, or any other suitable ultrasound data. The reflected ultrasound data 300 illustrates a frontwall echo 310 and a backwall echo 320. The frontwall and backwall echoes 310, 320, are produced when the emitted ultrasound energy reflects off of the front and rear surfaces, respectively, of the composite component. The reflected ultrasound data 300 also shows a noise profile 330, which represents the reflected ultrasound energy produced by material noise within the flawless composite component. The noise profile 330 of the reflected ultrasound data 300 can be used to establish the baseline noise amplitude value. For example, the baseline noise amplitude value can be a maximum amplitude of the noise profile 330, an average amplitude of the noise profile 330, a value one or more standard deviations above the average amplitude of the noise profile 330, or any other suitable value.

In some embodiments, noise levels for multiple flawless composite components are used to establish the baseline noise amplitude value. For example, flawless composite components of varying thicknesses are used to establish a function or algorithm for establishing the baseline noise amplitude value as a function of the thickness of the composite component 150. Still other methods for establishing the baseline noise amplitude value are considered, for instance using computer models, literature estimates, and the like.

Using the baseline noise amplitude value, the first threshold amplitude value is set at a value higher than the baseline noise amplitude value. The first threshold amplitude value can be set 0.5%, 1%, 1.5%, 2%, 2.5%, 3%, 4%, 5%, 10%, or any other suitable value higher than the baseline noise amplitude value, for example between 2% and 5%. In some embodiments, the first threshold amplitude value is adjustable to any value between 0.1% and 5% higher than the baseline noise amplitude value, to any value between 0.01% and 10% higher than the baseline noise amplitude value, or within any other suitable range. In the example of FIG. 3, the baseline noise amplitude value is set as the maximum amplitude of the noise profile 330, and a first threshold amplitude value 350 is selected as being slightly above the baseline noise amplitude value, that is to say the maximum value for the noise profile 330. In some embodiments, the first threshold amplitude value 350 can vary along the length of the composite component 150, for example with the first threshold amplitude value 350 for a first half of the composite component 150 being higher than the first threshold amplitude value 350 for a second half of the composite component 150, or vice-versa. In other embodiments, the first threshold amplitude value can be "stepped" to vary with the length of the composite component 150, having any suitable number of threshold values.

With continued reference to FIG. 3, the second threshold amplitude value 352, which is set at a higher value than the first threshold amplitude value 350, serves as an upper bound against which occurrences of the amplitude of the reflected ultrasound energy exceeding the first threshold amplitude value are compared. If the occurrences which exceed the first threshold amplitude value also exceed the second threshold amplitude value, the occurrence is indicative of a standard disbond, and not a kiss bond. The second threshold amplitude value can be set at some multiple of the first threshold amplitude value, for example 1.5 times, 2 times, 2.5 times, can be set at a value higher than the baseline noise amplitude value, for example 2% to 10% higher, and the like, or be based on separate calibration steps, for example by using one or more composite components with known disbonds. Still other approaches for setting the second threshold amplitude value are considered.

The first and second threshold amplitude values 350, 352 are then used, with the reflected ultrasound data, to identify one or more occurrences of the amplitude of the reflected ultrasound energy exceeding the first threshold amplitude value 350 and not exceeding the second threshold amplitude value 352. For example, each of the amplitude values in the reflected ultrasound data is compared to the threshold amplitude values 350, 352 to determine a number of occurrences of the amplitude of the reflected ultrasound energy between the threshold amplitude values 350, 352. In some embodiments, a visualization of the reflected ultrasound data and the amplitude threshold values 350, 352 can be presented via one or more display devices.

Figure 4A:
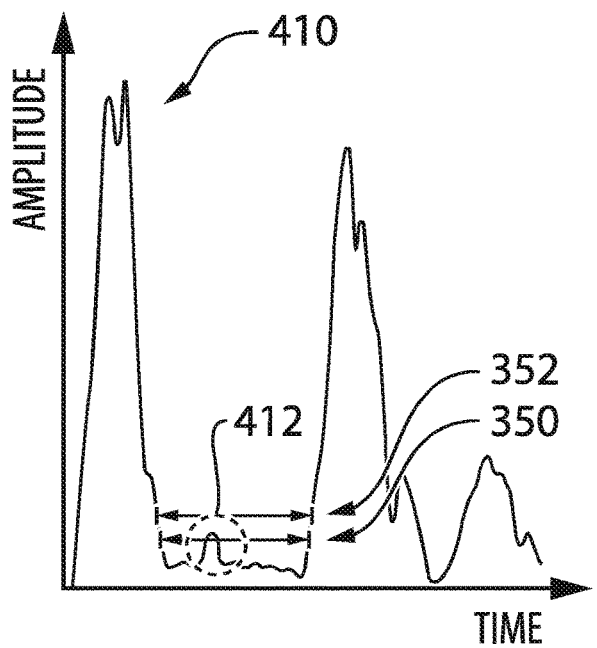
FIGS. 4A-C are illustrations of example scans of reflected ultrasound energy for an example composite component having a kiss bond.
Figure 4B:
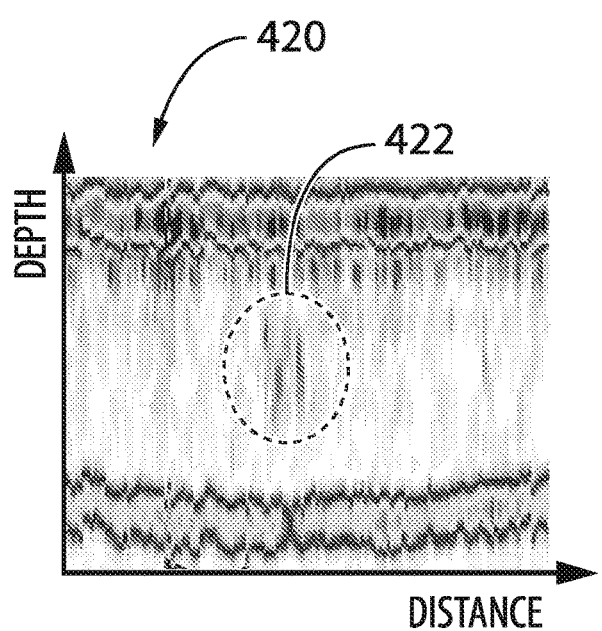
Figure 4C:
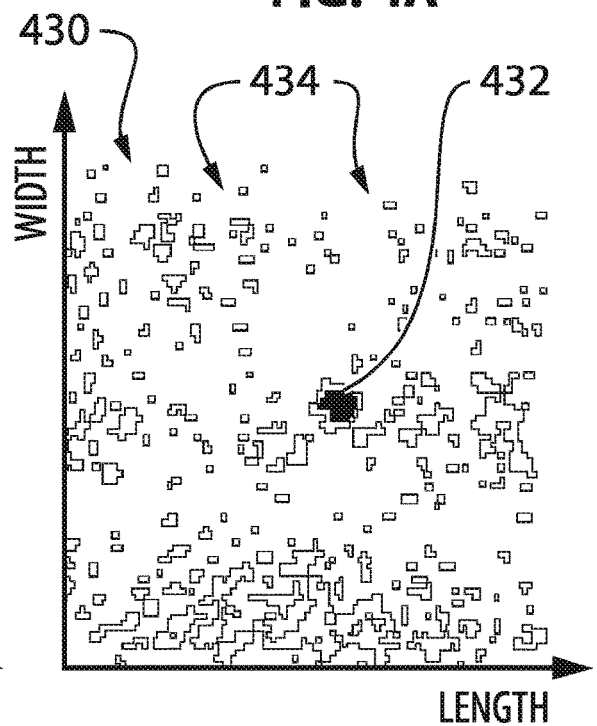

With reference to FIGS. 4A-C, example reflected ultrasound data for a composite component having a kiss bond, for example the composite component 150, is shown. In FIG. 4A, there is shown an example A-scan 410 of the composite component 150 with the threshold amplitude values 350, 352 superimposed thereon. A portion 412 of the reflected ultrasound energy being substantially above the first threshold amplitude value 350 and below the second threshold amplitude value 352 indicates an occurrence of the amplitude of the reflected ultrasound energy exceeding the first threshold amplitude value 350 and less than the second threshold amplitude value 352, which can be indicative of a kiss bond (i.e., is representative of a potential kiss bond instance).

If the A-scan 410 does not have a portion 412 or similar occurrence of the amplitude of the reflected ultrasound energy exceeding the first threshold amplitude value 350, then it can be determined that no kiss bond is present in the composite component 150. If the A-scan 410 has a portion which exceeds the second threshold amplitude value 352, then a standard disbond or other defect may be present. In some embodiments, additional scans, such as those of FIGS. 4B and/or 4C, are used to confirm the presence of the kiss bond.

FIGS. 4B and 4C illustrate an example B-scan 420 and an example C-scan 430 of the composite component 150. Portion 422 of B-scan 420 illustrates reflected ultrasound energy which is between the threshold amplitude values 350, 352, which can be adapted to be applied to B-scans. In addition, the B-scan 420 can be used to determine a depth and a dimension (e.g., length) of the kiss bond within the composite component 150. Portion 432 illustrates reflected ultrasound energy which is between the threshold amplitude values 350, 352, which can be adapted to be applied to C-scans. The portions 434 are surface noise signals, which can be rejected using time-of-flight parameters of the reflected ultrasound data, explained in greater detail herein below. In addition, the C-scan 430 can be used to determine the dimensions (e.g., area) and/or the location of the kiss bond within the composite component 150.

In some embodiments, multiple amplitude values in the reflected ultrasound data exceeding the first threshold amplitude value 350 which are associated with spatially-proximal locations of the composite component 150 are combined to indicate the presence of a single kiss bond. For example, if the reflected ultrasound data represents reflected ultrasound energy received from the composite component 150 in response to ultrasound energy emitted and reflected along a line or in a plane of the composite component 150, the resultant reflected ultrasound data is associated with spatially-proximal locations of the composite component 150. The values of the reflected ultrasound data can then be compared to the threshold amplitude value, and reflected ultrasound data values which are spatially-proximal and which exceed the threshold amplitude value can be grouped into a common occurrence.

With continued reference to FIGS. 2 and 3, at step 208, a backwall echo 320 of the reflected ultrasound energy is compared to a backwall echo threshold 340. The backwall echo threshold 340 can be based on reflected ultrasound data obtained from one or more flawless composite components. For example, the backwall echo produced by the flawless composite component is used to establish the reference echo against which the backwall echo 320 for the composite component 150 is compared. Because of the nature of kiss bonds, the backwall echo 320 of the composite component 150 having a kiss bond should be comparable to the backwall echo of the flawless composite component and/or to the frontwall echo 310 of the composite component 150. For example, the backwall echo threshold 340 is set at 0.5 dB, 1 dB, 1.5 dB, 1.75 dB, 2 dB, 3 dB, or any other suitable value lower than the backwall echo of the flawless composite component. In another example, the backwall echo threshold 340 is set at 75%, 80%, 85%, 90%, etc., of the amplitude of the frontwall echo 310. If the backwall echo 320 is below the backwall echo threshold 340, then a disbond, and not a kiss bond, can be detected as being present within the composite component 150.

At step 210, the kiss bond is detected in the composite component 150 is determined based on identified occurrences of the amplitude of the reflected ultrasound energy exceeding the first threshold amplitude value 350, being less than the second threshold amplitude value 352, and based on the comparison of the backwall echo 320 to the backwall echo threshold 340. In some embodiments, the presence of the one or more occurrences of the amplitude of the reflected ultrasound energy between the first and second threshold amplitude values 350, 352 indicates the presence of the kiss bond in the composite component 150. In some other embodiments, one or more persistence thresholds are established. For example, the reflected ultrasound data is used to determine a one-dimensional length of the kiss bond which can be compared to a one-dimensional persistence threshold, or another suitable length threshold, and if the length of the kiss bond exceeds the persistence threshold, a kiss bond is considered to be present in the composite component 150. Similarly, in another example, the reflected ultrasound data is used to determine an area of the kiss bond which can be compared to a two-dimensional persistence threshold, and if the area of the kiss bond exceeds the persistence threshold, or another suitable area threshold, a kiss bond is considered to be present in the composite component 150. In some embodiments, the reflected ultrasound data is also used to locate the kiss bond within the composite component 150.

In other embodiments, detecting the kiss bond is also based on a time-of-flight parameter for the reflected ultrasound data. For example, a determination is made that one or more occurrences have a non-zero depth within the composite component based on the time-of-flight parameters. This can be used to avoid interpreting surface noise produced by a surface of the composite component 150 as a kiss bond. In some instances, the time-of-flight parameter of the reflected ultrasound data is used to determine a depth for the kiss bond.

Optionally, at step 212, one or more characteristics of the kiss bond are determined based on the reflected ultrasound energy and/or the reflected ultrasound data. In some embodiments, a cross-section scan (B-scan) of the composite component 150 is produced based on the reflected ultrasound energy and/or the reflected ultrasound data, and the depth of the kiss bond within the composite component is determined based on the cross-sectional scan. In some other embodiments, a plan-view scan (C-scan) of the composite component 150 is produced based on the reflected ultrasound energy and/or the reflected ultrasound data, and the dimensions and/or location of the kiss bond within the composite component is determined based on the cross-sectional scan.

In some embodiments, the method 200 can be used to detect the presence of multiple kiss bonds in the composite component 150. For instance, the presence, and optionally the depth, size, and/or location, of multiple kiss bonds can be detected by displacing the ultrasonic transceiver 110 over the area of the composite component 150 and substantially continually performing the method 200 at multiple locations.

In some embodiments, prior to implementing part or all of the method 200, an ultrasonic test system, which can be the ultrasonic test system 100 or a separate ultrasonic test system, is used to determine whether the composite component 150 is free from disbonds or other defects more easily detectable than kiss bonds, for instance gaps, cracks, and the like. For example, before implementing step 206, the reflected ultrasound energy and/or the reflected ultrasound data is used to determine that the composite component is free from disbonds. For example, occurrences of the reflected ultrasound energy far exceeding the first threshold amplitude value 350, or exceeding a secondary threshold, can indicate the presence of a disbond. In another example, the backwall echo 320 being substantially less than the backwall echo threshold 340, for example more than 2 dB or 3 dB less, can indicate the presence of a disbond.

Additionally, or in the alternative, prior to implementing part or all of the method 200 for the composite component 150, calibration of the ultrasonic transceiver 110 and the ultrasonic test system 100 as a whole can be performed. For example, a reference composite component, having a known kiss bond, can be used to calibrate the operation of the ultrasonic test system. For instance, some or all of the steps of the method 200 are performed for the reference composite component, and various parameters of the ultrasonic test system are adjusted based on the results of the calibration.

Figure 5:
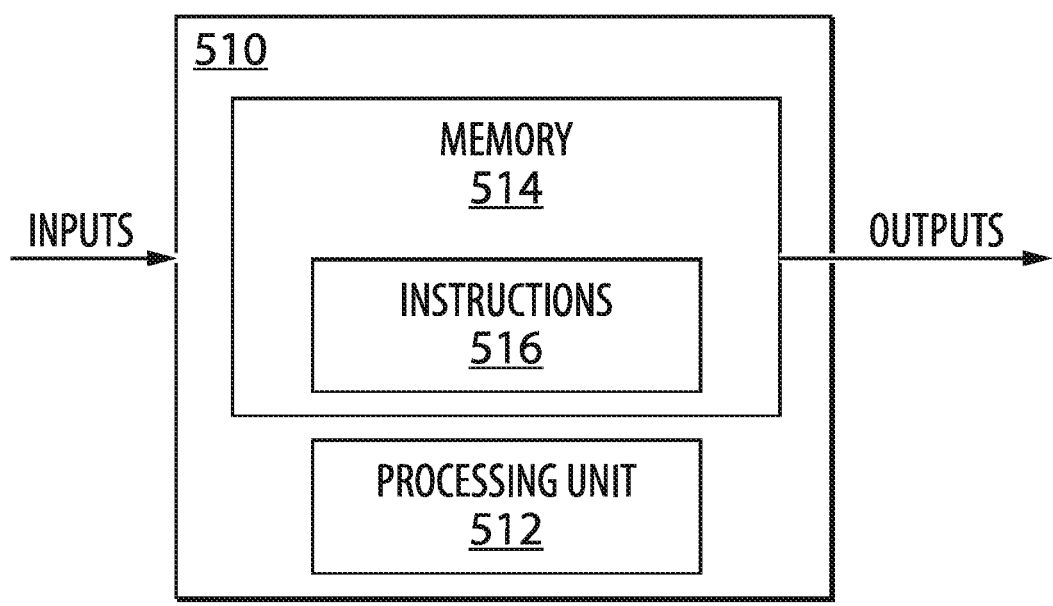
FIG. 5 is a block diagram of an example computing system for implementing the method of FIG. 2.

With reference to FIG. 5, the method 200 may be implemented by a computing device 510, comprising a processing unit 512 and a memory 514 which has stored therein computer-executable instructions 516. The processing unit 512 may comprise any suitable devices configured to cause a series of steps to be performed so as to implement the method 200 such that instructions 516, when executed by the computing device 510 or other programmable apparatus, may cause the functions/acts/steps specified in the methods described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium such as, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 514 may comprise any storage means (e.g., devices) suitable for retrievably storing the computer-executable instructions 516 executable by processing unit 512.

The methods and systems for detecting a kiss bond in a composite component using ultrasonic testing described herein may be implemented in a high-level procedural or object-oriented programming or scripting language, or a combination thereof, to communicate with or assist in the operation of a computer system, for example the computing device 510. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A system for kiss bond detection in a composite component, the system comprising:
   an ultrasonic transmitter configured to emit ultrasound energy into the composite component;
   an ultrasonic receiver configured to receive ultrasound energy from the composite component following an interaction between the composite component and the emitted ultrasound energy;
   at least one data processor; and
   non-transitory machine-readable memory operatively coupled to the at least one data processor, the machine-readable memory storing computer-readable instructions executable by the at least one data processor for:
      using reflected ultrasound data representative of the reflected ultrasound energy from the composite component received at the ultrasonic receiver, a first threshold amplitude value between 2% and 5% higher than a predetermined baseline noise amplitude value of expected material noise in the reflected ultrasound energy from the composite component, and a second threshold amplitude value higher than the first threshold amplitude value,
      identifying one or more occurrences of an amplitude of the reflected ultrasound energy exceeding the threshold amplitude value and less than the second threshold amplitude value, the one or more occurrences representing a potential kiss bond instance in the composite component;
      comparing a backwall echo of the reflected ultrasound energy to a backwall echo threshold; and
      determining the potential kiss bond instance to be a kiss bond in the composite component based on the identified one or more occurrences of the amplitude of the reflected ultrasound energy and the backwall echo being not less than the backwall echo threshold.

2. The system of claim 1, wherein the computer-readable instructions are further executable for determining that the one or more occurrences are associated with a non-zero depth in the composite component based on a time-of-flight parameter of the reflected ultrasound data.

3. The system of claim 1, wherein the computer-readable instructions are further executable for determining a depth of the potential kiss bond instance in the composite component based on the reflected ultrasound data.

4. The system of claim 1, wherein the computer-readable instructions are further executable for determining a one-dimensional length of the potential kiss bond instance, and wherein determining the potential kiss bond instance to be the kiss bond is further based on comparing the one-dimensional length of the potential kiss bond instance to a threshold one-dimensional length.

5. The system of claim 1, wherein the computer-readable instructions are further executable for determining an area of the potential kiss bond instance based on the reflected ultrasound data.

6. The system of claim 5, wherein determining the area of the potential kiss bond instance comprises identifying a plurality of adjacent occurrences of the amplitude of the reflected ultrasound energy exceeding the threshold amplitude value, wherein the adjacent occurrences have substantially common depth in the composite component based on a time-of-flight parameter of the reflected ultrasound data.

7. The system of claim 5, wherein determining the potential kiss bond instance to be the kiss bond is further based on comparing the area of the potential kiss bond instance to a threshold area.

8. The system of claim 1, wherein the computer-readable instructions are further executable for determining a location of the potential kiss bond instance within the composite component based on the reflected ultrasound data.

9. The system of claim 1, wherein determining the potential kiss bond instance to be the kiss bond is further based on the backwall echo exceeding the backwall echo threshold.

10. The system of claim 9, wherein the backwall echo threshold is 80% of an amplitude of a backwall echo produced by a pristine composite component.

11. The system of claim 1, wherein the ultrasonic transmitter is configured to emit the ultrasound energy at a frequency between 5 MHz and 10 MHz.

12. The system of claim 1, wherein the reflected ultrasound data is representative of a half-wave rectified ultrasound signal.

13. A method for kiss bond detection in a composite component, comprising:
using reflected ultrasound data representative of reflected ultrasound energy from the composite component, a first threshold amplitude value between 2% and 5% higher than a predetermined baseline noise amplitude value of expected material noise in the reflected ultrasound energy from the composite component, and a second threshold amplitude value higher than the first threshold amplitude value,
identifying one or more occurrences of an amplitude of the reflected ultrasound energy exceeding the threshold amplitude value and less than the second threshold amplitude value, the one or more occurrences representing a potential kiss bond instance in the composite component;
comparing a backwall echo of the reflected ultrasound energy to a backwall echo threshold; and
determining the potential kiss bond instance to be a kiss bond in the composite component based on the identified one or more occurrences of the amplitude of the reflected ultrasound energy and the backwall echo being not less than the backwall echo threshold.

14. The method of claim 13, wherein the computer-readable instructions are further executable for determining that the one or more occurrences are associated with a non-zero depth in the composite component based on a time-of-flight parameter of the reflected ultrasound data.

15. The method of claim 13, further comprising determining a depth of the potential kiss bond instance in the composite component based on the reflected ultrasound data.

16. The method of claim 13, further comprising determining a one-dimensional length of the potential kiss bond instance, and wherein determining the potential kiss bond instance to be the kiss bond is further based on comparing the one-dimensional length of the potential kiss bond instance to a threshold one-dimensional length.

17. The method of claim 13, further comprising determining an area of the potential kiss bond instance based on the reflected ultrasound data.

18. The method of claim 17, wherein determining the area of the potential kiss bond instance comprises identifying a plurality of adjacent occurrences of the amplitude of the reflected ultrasound energy exceeding the threshold amplitude value, wherein the adjacent occurrences have substantially common depth in the composite component based on a time-of-flight parameter of the reflected ultrasound data.

19. The method of claim 17, wherein determining the potential kiss bond instance to be the kiss bond is further based on comparing the area of the potential kiss bond instance to a threshold area.

20. The method of claim 13, further comprising determining a location of the potential kiss bond instance within the composite component based on the reflected ultrasound data.

21. The method of claim 13, wherein determining the potential kiss bond instance to be the kiss bond is further based on the comparing comprises determining that the backwall echo exceeds the backwall echo threshold.

22. The method of claim 21, wherein the backwall echo threshold is 80% of an amplitude of a backwall echo produced by a pristine composite component.

* * * * *